United States Patent [19]

Vera et al.

[11] 3,874,940

[45] Apr. 1, 1975

[54] CEMENTATION PROCESS

[75] Inventors: Carlos Molina Vera; Carlos Vilches Guzman; Luis Soto-Krebs, all of Santiago, Chile

[73] Assignee: Compania de Aero del Pacifico S.A.(Chile), Santiago, Chile

[22] Filed: Oct. 27, 1971

[21] Appl. No.: 192,939

[52] U.S. Cl. .................................. 75/109, 75/117
[51] Int. Cl. ............................................ C22b 3/00
[58] Field of Search ............................. 75/109, 117

[56] References Cited
UNITED STATES PATENTS

| | | | |
|---|---|---|---|
| 2,070,134 | 2/1937 | Keyes | 75/109 |
| 2,083,031 | 6/1937 | Maclennan | 75/109 |
| 2,130,278 | 9/1938 | Keyes | 75/109 X |
| 2,204,898 | 6/1940 | Lee et al. | 75/109 |
| 3,154,411 | 10/1964 | Back et al. | 75/109 |
| 3,288,598 | 11/1966 | Hogue | 75/109 |

*Primary Examiner*—Herbert T. Carter

[57] ABSTRACT

Precipitation of a metal from a salt solution by a less electropositive metal is improved by carrying out the process with a specific ratio of available precipitant surface to concentration of the precipitating metal at all times, preferably under conditions of abrading agitation sufficient to maintain the precipitant surface clear of precipitated metal. The precipitant should have a high surface-to-volume ratio but sufficient size and size-distribution for good abrading action, and be continuously present in an amount of from several hundred to several thousand times the amount stoichiometrically required to react with the solution at a given time. With less agitation and abrasion, good results may still be obtained but the proportion of iron must be even higher. The cementation of copper on pig iron granules is described.

12 Claims, 7 Drawing Figures

INVENTORS
LUIS SOTO-KREBS
CARLOS MOLINA VER
CARLOS VILCHS GUZMA by

*Marn & Jangarathis*

ATTORNEYS

CEMENTATION PROCESS

BACKGROUND OF THE INVENTION

1. Field of the Invention

The present invention relates generally to cementation processes, wherein a metal is precipitated from a salt solution by a less electropositive metal, which replaces it in the solution. The metal used is referred to as the precipitant and the metal obtained is referred to as the precipitate. More particularly, the invention relates to the use of pig iron as a precipitant, under conditions which yield as high as 99.9% of the available precipitate in the form of a very high purity cemented metal.

The recovery of copper from leach solutions by precipitation on iron has been known for hundreds of years. The chemical reaction for copper sulfate is as follows:

$$Fe + CuSO_4 \longrightarrow Cu + FeSO_4 \qquad [1]$$

On a stoichiometric basis, this reaction will consume 0.88 pounds of iron for every pound of copper produced. However, the solutions are acidic, and additional iron is consumed as follows:

$$Fe + Fe_2(SO_4)_3 \longrightarrow 3FeSO_4 \qquad [2]$$

$$Fe + H_2SO_4 \longrightarrow H_2 + FeSO_4 \qquad [3]$$

It is known that reaction [2] proceeds at about the same rate as reaction [1], but that reaction [3] is considerably slower. Because of reactions [2] and [3], the actual consumption of iron during cementation has been, generally, in the range of 1.5 to 2.5 pounds per pound of copper recovered.

In the United States, copper cementation is used commercially on very dilute solutions such as mine water, heap leaching water and various tailing streams that are too dilute for economic recovery of copper values by electrolysis. Generally, such solutions contain from 0.5 to 10 grams per liter (gpl) of copper. Elsewhere, more concentrated solutions, containing 10 to 30 or more gpl of copper, are cemented.

It is known that the precipitation reaction is first order and depends primarily on the replacement of depleted solution in the boundary film surrounding the iron with fresh solution. Thus, multistage launders are often employed, with a stoichiometric excess of scrap iron in the form of tin cans, detinned scrap, turnings, filings etc. A typical procedure is to charge the launders with a load of scrap iron, run the copper-bearing head solution through the launders until the iron is exhausted, empty the launder and remove the copper precipitate. More recently, reactors have been employed wherein the solution has a high initial velocity and a low terminal velocity. In such reactors, the solution passes upwardly through a bed of iron in a constricted area, to a larger, relatively quiescent zone. Such reactors may have the shape of an inverted cone. In one case, the iron does not form a bed, but is held in a state of dynamic suspension by the solution (U.S. Pat. No. 3,154,411). In the latter case, sponge iron is the preferred precipitant, but the cost of this material makes its use questionable in many localities. In addition to launders and conical vessels, cylindrical vessels with their axes in the horizontal plane or slightly tilted, and which are adapted for rotation, are also known. Such reactors keep the load of iron tumbling and abrading, which is considered advantageous.

The source of iron used at any given location is manifestly, the cheapest possible material. Tin cans, cuttings, turnings, nails, bulk scrap etc. are all used (tin will precipitate copper). The need for cheap iron values is perhaps the single biggest barrier to large scale use of cementation, as well as the largest problem with existing installations. More particularly, the price of scrap iron is extremely unsteady, and when it is very high cementation becomes economically unattractive. Moreover, the quality of purchased scrap iron is unreliable. Plant scrap is often covered with grease or oil, which must be removed. Painted surfaces are of no use since they will not react. Paper, rock or wood are often included, as well as other metals. All of these will reduce the purity of the cement copper. Typically, the product may be 80–85% Cu. Most importantly, the impurities in the iron itself create problems in that impure iron, particularly high carbon irons, tend to precipitate very adherent copper which will completely block the reaction because of the lack of available iron surface.

The physical size and shape of scrap also create problems. The lack of a uniform reaction surface makes the cementation process difficult to control, and less than complete copper recovery may result, requiring recycling or additional treatment. It is to be particularly noted that when the scrap iron is used until exchausted there is no control over reactant proportions. Further, facilities and personnel must be provided for storing, cutting up, cleaning and moving the scrap. Large pieces of scrap will of course reduce the effective volume of a reactor.

Cement copper produced in conventional processes is generally in the form of a fine powder of a size in the range of 10 to 100 microns. On contact with air, such a product will oxidize very rapidly to $Cu_2O$, further reducing product purity. Such an impure product must of course be refined before it is saleable, and because of the fine particle size, special precautions are necessary to avoid dusting losses.

2. Prior Art

U.S. Pat. No. 3,288,598 discloses the use of sponge iron as a precipitant in a system that encourages abrasion of the sponge to dislodge copper particles.

U.S. Pat. No. 3,333,953 provides high pressure jets for the head solution which increase solution-metal contact and also act to dislodge plated particles.

U.S. Pat. No. 3,457,065 utilizes injected air to increase solution-metal contact.

U.S. Pat. No. 3,499,756, while related to precipitating tin on iron, notes that the iron should be pure and of low carbon content.

An inverted cone reactor is disclosed in U.S. Pat. No. 3,154,411, with sponge or powdered iron being the preferred precipitant.

A vertical cylindrical reactor is provided in U.S. Pat. No. 3,560,201; the head solution passes upwardly through a bed of scrap iron, and the column is periodically flushed to recover product.

The use of pig iron pellets or granules as a precipitant is disclosed in U.S. Pat. No. 2,070,134. The patentee teaches that by granulating the iron with a water jet in steam the formation of a magnetite layer on the pellet surfaces is prevented. While not specified, it is apparent that this would be of concern only for cementation from nearly neutral solutions, since normal head solutions, with pH of about 1.5 to 3, will dissolve any such layer. The patent teaches contacting of an ore slurry with such pellets, with product separation being effected by flotation. The flotation concentrate will contain the precipitated copper as well as the ore insolubles, gangue, copper sulfide etc. It is of course essential that the copper be very finely divided so that it can be floated; in this process any massive precipitates would be lost. The patent discloses only bench scale batch tests, but it is apparent from other reports that if such pellets were to be used in a conventional, continuous cementing process with launders or the like, they would quickly become coated with copper and inert (see U.S. Pat. No. 3,154,411 and Nadkarni et al., "A Kinetic Study of Copper Precipitation On Iron", Trans. of the Metallurgical Soc. of AIME, vol. 239, pp. 581–585, 1967).

OBJECTS OF THE INVENTION

A general object of the present invention is to provide an improved cementation process.

Another object of the present invention is to provide a truly continuous cementation process.

A further object of the present invention is to provide a cementation process which consistently recovers as high as 99.9% of the metal values in a product of higher purity than prior art processes.

A still further object of the present invention is to provide a cementation product of high specific gravity and larger particle size than prior art processes, whereby losses during refining are eliminated.

Yet another object of the present invention is to provide a cementation process that utilizes a low-cost precipitant that is readily available and steady in price.

Another object of the present invention is to provide a cementation process that does not require elaborate or specially manufactured equipment.

Various other objects and advantages of the invention will become clear from the following description of embodiments thereof, and the novel features will be particularly pointed out in connection with the appended claims.

THE DRAWINGS

Reference will hereinafter be made to the accompanying drawings, in which:

FIG. 1 illustrates the effect of varying the amount of available precipitant.

FIG. 2 illustrates the effect of varying the amount of precipitant with greater agitation.

FIG. 3 illustrates the effect of varying the copper content of the head solution.

FIG. 4 illustrates the effect of varying rotational speed of the reactor, i.e., the degreee of agitation.

FIG. 5 is similar to FIG. 3, but for different operating conditions.

FIG. 6 is similar to FIG. 4, but for different operating conditions.

FIG. 7 illustrates the effect of varying the flow rate of the head solution.

DESCRIPTION OF EMBODIMENTS

Figure 2:
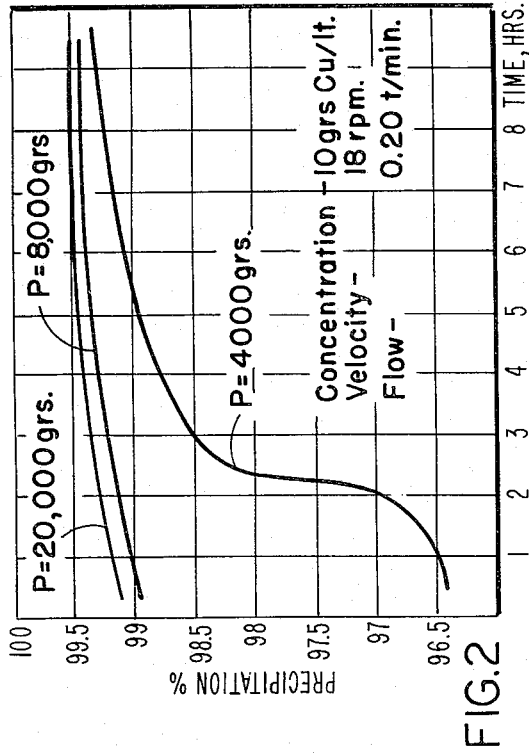
FIGS. 1 through 7 are plots of percent of available copper precipitated versus time.

The present invention is based, at least in part, on the discovery that impure iron granules may be employed in a continuous cementation process without blocking by plated copper, providing that the physical and kinetic parameters are controlled within certain limits. The physical factors of importance are the size, shape and surface of the precipitant, the type of reactor and its speed of operation. The kinetic factors are the surface area of precipitant available at a given time, the volume of head solution flowing through the reactor per unit time, and the concentration of copper in the solution. Other factors, pH and temperature for example, are also controlled, but their role is not as significant as the previously noted parameters.

The preferred precipitant is pig iron granules, the preference being determined mainly because of low cost and ready availability. The granules will have a high carbon content and a variety of impurities; it is necessary only to avoid large amounts of impurities which will passivate the iron (i.e., chromium and/or nickel). If the granules are formed by passing molten droplets through a horizontal steam and water jet they will be irregular in shape with a rough, raisen-like surface which is especially suitable for the invention. However, pig iron granules produced by conventional shotting, with smooth surfaces, are quite satisfactory. It is noted that since the solutions used are acid the presence of an oxide on the granule surfaces is unimportant. Size and size distribution of the granules are both important. In addition to providing a large surface area per unit volume, a particle size distribution assists in abrading the particles in highly agitated systems. Prior workers have appreciated that the reaction proceeds faster with smaller precipitant particles, but this is true only up to a point. It has been found that larger particles are necessary to provide sufficient mass and smaller particles are necessary to provide sufficient density so that a self-abrading mass is created. In this connection it is noted that bench scale tests can be very deceiving, in that a few pounds of granules will provide very little abrasion and copper may build up on the surfaces, whereas a full scale reactor, with several thousand pounds of granules will provide excellent abrasion and continuously create fresh precipitation surfaces. It is felt that prior workers have emphasized agitation of the solution to bring copper values across the boundary film to the iron surface, and have not paid enough attention to the second half of the problem, removing copper from that surface. It has been determined that a size-graded particle mixture with 50 to 80% +10 mesh forms a very satisfactory precipitant.

While pig irons are preferred because of their cost and availability, other materials can also be employed: foundry irons, perlitic steel, cast iron, cupola iron etc. are all satisfactory. It is only necessary to avoid impurities which will passivate the iron or which, under reaction conditions, will contaminate the precipitate. A particle size and size distribution adapted for abrasion are really more important than chemical composition.

A variety of reactors can be employed with the invention, but the simplest is a cylindrical vessel mounted horizontally on trunnions for rotation at a controlled speed, with an inlet at one end and an outlet at the other. During rotation, the precipitant is constantly tumbled on itself and particles are abraded. The rotation also provides the solution agitation necessary to bring about good reactant contact. Abrasion and agitation are both improved if the vessel is provided with lifters, which are projections on the inside wall parallel to the axis. Radial lifters on the outlet end-wall facilitate discharge of spent solution, precipitate and unreacted precipitant. The latter may be magnetically separated. Mounting of the vessel may be horizontal or slightly inclined, with the inlet a bit higher than the outlet.

The concentration of the head solution is generally a given factor and can not be economically varied. Solutions may be very dilute, with 1 gpl or less copper, or they may have up to 30 gpl Cu. What can be varied are the feed rate of the solution, the total amount of precipitant present and, to a limited extent, the speed of rotation of the vessel. Naturally, it is desired to feed the solution as fast as possible while still making a complete recovery of copper values.

Prior workers have uniformly taught that a stoichiometric excess of scrap iron must be present for good results. Merely providing a few pounds of iron for each pound of copper to be recovered, however, is inefficient and may result in a blocking, coherent copper coating that stops the reaction. The extraordinary results of the present invention are believed to result from (1) providing the precipitant in a form having a relatively high surface-to-volume ratio and (2) providing an amount of precipitant continuously maintained from several hundred to several thousand times the stoichiometric amount required at any given moment to completely deplete the solution present. The constant abrading contact of iron and copper is believed to be responsible for the high quality of the cement produced and its desirable density and particle size. Surprisingly, iron consumption per pound of copper is low, about 1.1–1.2 pounds under optimum conditions.

To calculate the load of precipitant required in accordance with the invention the following expression is useful:

$$I = \frac{P}{c \cdot \Phi} \quad [4]$$

where:
P = weight of precipitant, in kilograms
c = copper concentration, in grams per liter
$\Phi$ = volume of head solution in liters per minute
I = reaction index.

It will be appreciated that this expression does not take into account many factors: precipitant size, pH, agitation conditions etc. However, for a stable operation with the type of precipitant described and with the preferred abrading contact of particles and othere nominal operating conditions, it has been determined that an index in the range of 1–10 is very good, with a range of 1–2.5 preferred. The extent of the stoichiometric excess of precipitant required by the invention is easy to calculate. Presume a head solution of 10 gpl Cu, a volume of 1000 lpm and an index of 2. Solving equation [4] for precipitant loads gives a result of 20,000 kilograms. Thus, the amount of precipitant present is roughly 2,300 times the amount theoretically required to exhaust the solution present at a given moment. In carrying out the invention, it is desirable to keep the index as constant as possible, which means that in the above example about 11–13 kilograms of fresh precipitant would be added to the reactor each minute.

In summary, the invention is carried out preferably using pig iron granules of high surface-to-volume ratio but of sufficient size and size distribution to be self-abrading, in a reactor which encourages such abrasion, with the amount of precipitant present being from several hundred to several thousand times the stoichiometrically required amount at any given moment. Under these conditions, a cement of consistently higher copper content is produced. Copper recovery has reached 99.9%. Using the same equipment previously used for cementation on scrap iron productivity has increased 300 to 400%. The grain size and density of the copper are improved. Equipment and workers required to cut up, move and store scrap are substantially eliminated, since the granules are adapted to handling in automatic equipment. And, as noted hereinabove, iron consumption is surprisingly low.

Understanding of the invention will be further facilitated by reference to the following specific examples thereof, but it is to be understood that these are set forth for illustrative purposes only and are not to be interpreted in a limiting sense.

EXAMPLES

In the tests reported below two types of granulated pig iron were employed as the precipitant. The first, type A, had a smooth surface and a generally ellipsoidal shape. The size distribution was as follows:

| Mesh | Pct. |
| --- | --- |
| +10 | 88.8 |
| −10+60 | 3.0 |
| −60 | 8.2 |

Chemical composition was as follows:

| | | |
| --- | --- | --- |
| Total C | | 4.3% |
| combined | 0.6 | |
| graphitic | 3.7 | |
| Mn | | 0.72 |
| P | | 0.14 |
| S | | 0.052 |
| Si | | 0.65 |
| Total Fe | | 80. |
| Combined $O_2$ and minor impurities | | Balance |

Other impurities detected included Ca, Mg and others.

The second precipitant, Type B, had a shape and surface quality similar to raisins, and the size distribution was as follows:

| Mesh | Pct. |
| --- | --- |
| +10 | 78.6 |
| −10+60 | 19.9 |
| −60 | 1.5 |

Chemical composition was as follows:

| | | |
| --- | --- | --- |
| Total C | | 3.85 |
| combined C | 3.68 | |
| graphitic | 0.17 | |
| Mn | | 0.06 |
| P | | 0.28 |
| Si | | 0.62 |
| S | | 0.07 |
| Total Fe | | 83.3 |
| Combined $O_2$ and impurities | | Balance |

Impurities included 0.4% V, 0.1% Ti, Ca etc. In this iron, about half of the combined carbon was cementite.

It is of interest to note that large piles of this precipitant have been exposed for up to a year adjacent the sea coast. While they acquire a thin oxide coating this is dissoved in a few seconds in the reactor. More important, the piles did not show any significant tendency to weld or compact and were readily handled.

Initial tests were carried out in a cylindrical vessel 250 mm long with a diameter of 290 mm. The inlet was a cicular axial orifice in one end 12.5 mm in diameter. The outlet comprised 36 holes in three rings in the opposite end, the outside ring being 12.5 mm in diameter. The vessel was tilted slightly toward the outlet, and had a useful volume of 2.74 liters.

Figure 4:
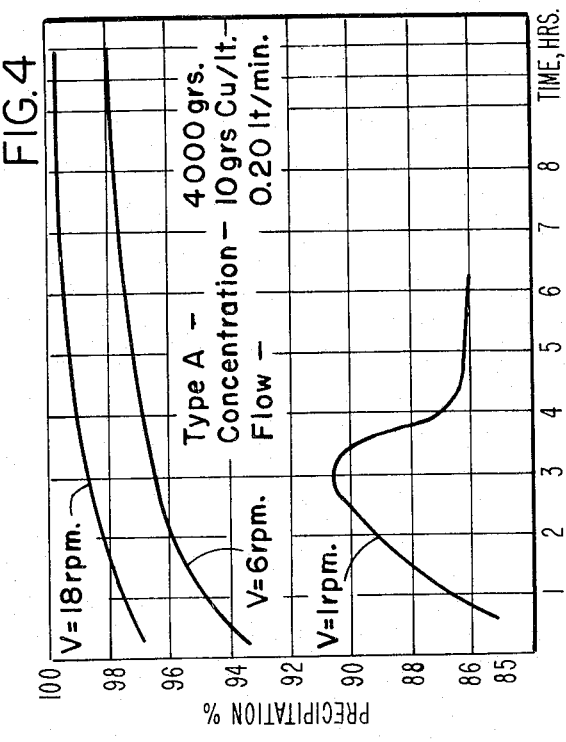
Figure 3:
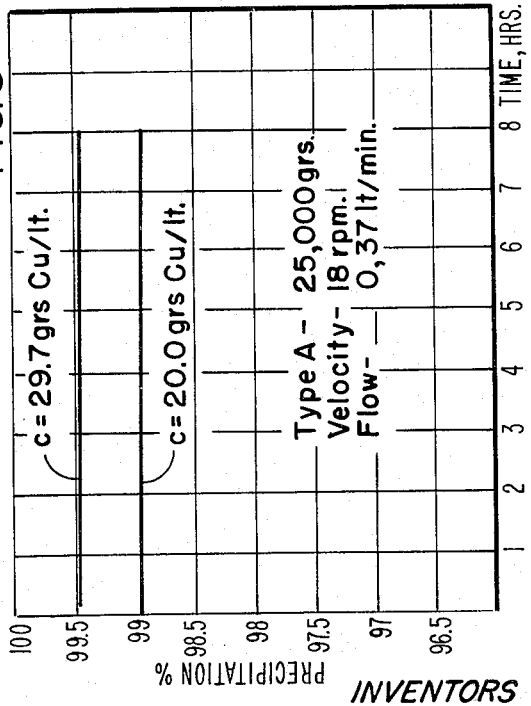
Figure 7:
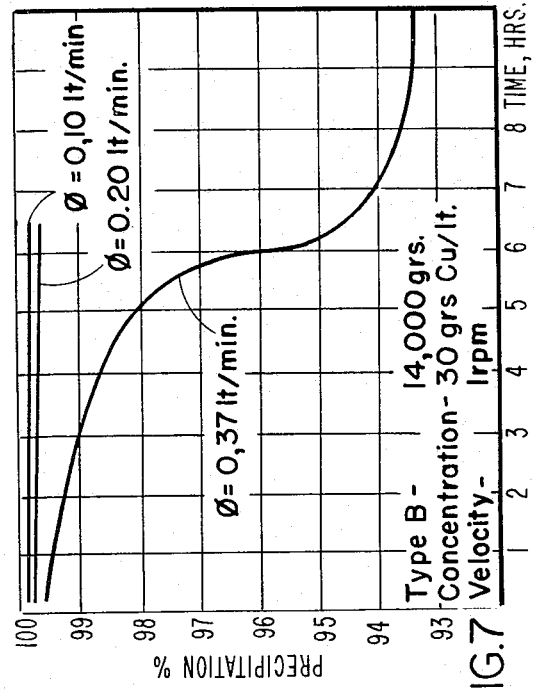
Figure 5:
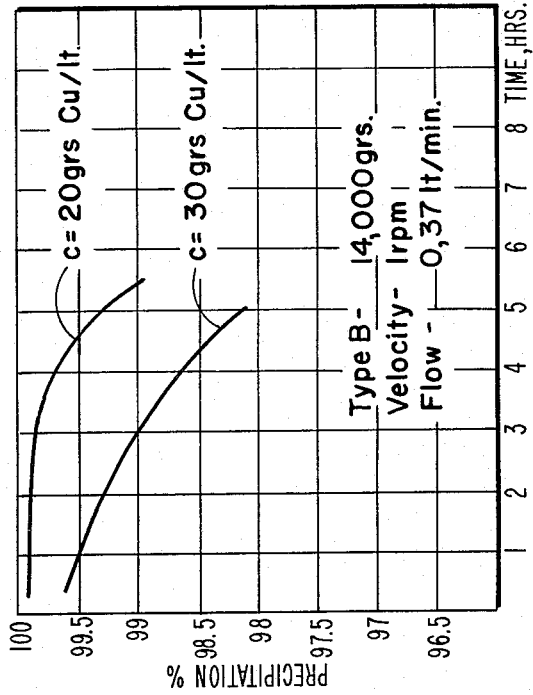
Figure 6:
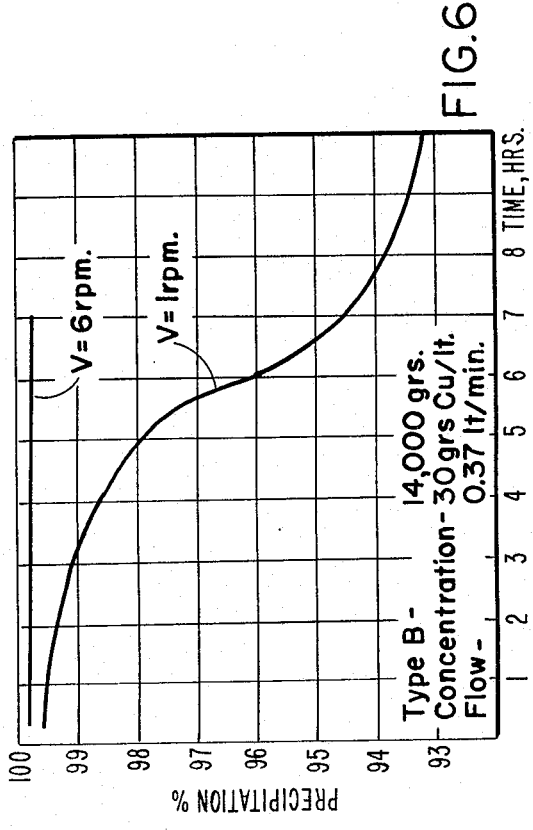

The vessel was mounted for rotation at speeds up to 35 rpm (in bench scale tests, higher speeds than available in plantsize reactors tend to compensate for the lighter load of precipitant). A pump was provided to feed solution at up to 0.37 lpm. Table I below summarizes the results of early tests.

recoveries at a high flow rate and higher copper concentrations, as shown in FIG. 3. The effect of agitation speed is shown in FIG. 4 but, as noted above, in commercial usage a low speed (1-3 rpm) is satisfactory because of the great mass of precipitant available increases its abrading power. Precipitant B, with its rough textured surface, proved more efficient than the A type, as shown in FIG. 5, where slow agitation, high flow rate and concentrated solutions were used. However, this was significantly improved by raising the speed from 1 to 6 rpm, as shown in FIG. 6. At the slower speed, good results were obtained with lower flow rates, as shown in FIG. 7.

During these tests other parameters were also investigated. Industrial head solutions were used as well as laboratory solutions. The pH was varied from 1.5 to 3.0, and initial temperatures were varied between 10° and 80°C. It was determined that the effects of these

TABLE I

|  | A | B | C | D | E | F(3) | G | H | I |
|---|---|---|---|---|---|---|---|---|---|
| Index | 0.48 | 0.95 | 0.50 | 1.07 | 1.43 | 1.43 | 1.26 | 1.91 | 5.94 |
| Type of granulated pig iron | A | A | B | B | A | A | B | B | B |
| Copper recovery% | —(1) | —(1) | —(2) 29.6 | 97.7 | 88.6 | 97.6 | 99.6 | 99.8 | 95.9 |
| Copper content of Precipitate(%) | —(1) | —(1) | 81.4 | 82.6 | 82.4 | 81.3 | 89.4 | 82.8 | 79.1 |
| Yield (Kg. of precipitant/Kg.Cu) | —(1) | —(1) | — | 1.14 | 1.15 | 1.21 | 1.15 | 1.10 | 1.37 |
| Duration of test (min.) | 60 | 120 | 411 | 330 | 270 | 375 | 1020 | 330 | 450 |

(1) No copper was obtained. Copper adhered firmly to the precipitant and blocked the reaction.
(2) Only the small proportion of copper indicated was recovered. The rest covered the precipitant firmly and blocked the reaction. This test was done at 18RPM. Tests A and B were at only 1RPM.
(3) This test has the same index as test E but it was run at 6 RPM while E was run at 1 RPM.

It was concluded from these tests that for either of these precipitants, the value of the index should be at least 1; at lower values the copper smothers the precipitant and blocks the reaction. The index can be as high as 10, but economically the preferred range is 1 to about 2.5.

Figure 1:
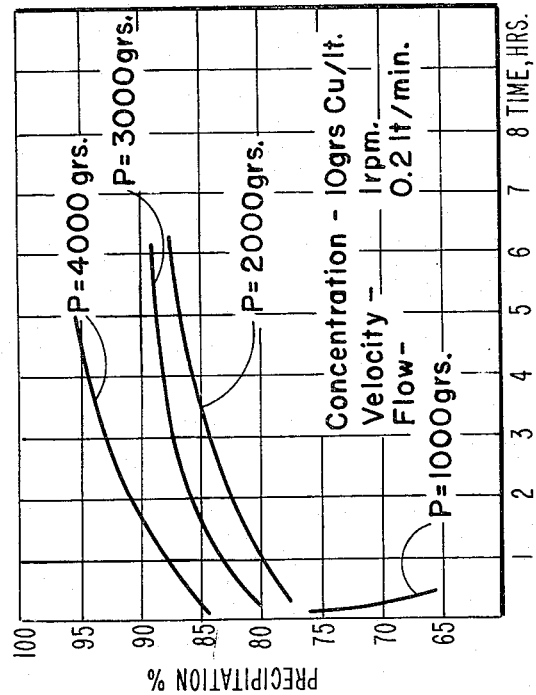

FIG. 1 shows that copper recovery varied directly as the precipitant load was raised from 1 to 4 kilograms, but did not go above 90%. By raising the velocity and increasing precipitant to as much as 20 kilograms, recoveries above 96.5 and as high as 99.5% were achieved, as shown in FIG. 2. With a precipitant load of 25 kilograms, it was possible to maintain excellent changes were no different in the present invention than they would be expected to be in conventional cementation.

Pilot scale tests were then carried out, using the Type B precipitant and a vessel 3.4 meters long and 1.15 meters in diameter. During several weeks of testing, a control vessel was run on scrap iron following conventional practice and using the same head solutions. The vessel operated in accordance with the invention produced 3.5 times as much copper as the control. Further, the copper content of the cement was higher, and iron consumption was lower. The results of these efforts are summarized in Table II below.

TABLE II

|  | 1 — 1 | 1 — 2 | 1 — 3 |
|---|---|---|---|
| Vessel dimensions (Diameter × length) (m) | 1.15 × 3.40 | 1.15 × 3.40 | 1.15 × 3.40 |
| Outlet | peripherical | peripherical | central |
| Index (2) | 3.5 to 0.8 | 1.3 to 2.1 | 1.5 to 1.9 |
| Copper content in the precipitated copper(%) | 85 to 65 | 86 to 88 | 87 to 90 |
| Recovery(%) | 99.0 to 3.0 | 99.5 | 99.6 |
| Yield (Kg. of precipitant/Kg.Cu) | 1.46 to 0.0 | 1.41 | 1.35 |

| TEST | 1 — 4 | 1 — 5 | 1 — 6 | 1 — 7 |
|---|---|---|---|---|
| Vessel dimensions (Diam. × length) (m) | 1.15 × 3.40 | 1.15 × 3.40 | 1.15 × 3.40 | 2.20 × 2.20 |
| Outlet | Central | Central | Central | Central |
| Index (2) | 3.0-3.3 | 1.1-1.3 | 2.6-3.0 | 1.3-1.5 |
| Copper content in precipitated copper (%) | 84 – 86 | 89 – 93 | 84 – 86 | 86 – 89 |

TABLE II — Continued

| Test | 1-4 | 1-5 | 1-6 | 1-7 |
| --- | --- | --- | --- | --- |
| Recovery (%) | 99.7 | 99.7 | 99.7 | 99.5 |
| Yield (Kg. of precipitant/Kg.Cu) | 1.50 | 1.30 | 1.39 | 1.12 |

(1) In test I—1, the operator increased the flow rate to a point where the index dropped below 1, and copper immediately blocked the reaction.
(2) In these tests precipitant was added at various intervals to determine index variations. It is preferred, of course, to add it continuously or every few minutes.

Using identical solutions in two substantially identical cylindrical precipitators as described in tests I-3 to I-6, with a central outlet, copper was precipitated using light scrap iron in one vessel and Type B granulated pig iron in the other. The light scrap was considered specially adequate for the cementation of copper. Both precipitators were rotated at 3 RPM.

The maximum production attained with scrap was 1000 liters per hour of a copper sulphate head solution containing 25 grams of copper per liter. With this volume 95 to 97% of the copper was recovered: the precipitated copper contained between 66 and 74% copper and an average of 1.3 kg. of precipitant were consumed per kilogram of copper produced.

The comparison with the performance obtained with this invention is of special interest. Keeping the index between 1.05 and 1.20, it was possible to process consistently, 3,500 liters per hour of the same head solution described above. In spite of this increase of 350% in productivity the precipitated copper contained between 85 and 88% copper, the recovery was consistently higher than 99% (highest recovery measured: 99.85%) and the average yield was 1.26 kilograms of precipitant consumed per kilo of copper produced.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A process for the continuous precipitation of copper from a head solution thereof onto a metallic iron precipitant comprising:
   charging said precipitant to a reactor in the form of granulated particles of substantially plus 10 mesh size which are self-abrading under conditions of agitation, said precipitant being present in an amount sufficient to provide a reaction index of at least 1;
   continuously charging said head solution to said reactor and removing spent solution and precipitate;
   continuously agitating said head solution and said precipitant to promote solution-precipitant contact and said self-abrasion; and
   at least periodically charging additional precipitant to said reactor to maintain said reaction index.

2. The process as claimed in claim 1, wherein said precipitant is a pig iron.

3. The process as claimed in claim 2, wherein said pig iron is in the form of granules of which at least 50 percent are plus 10 mesh.

4. The process as claimed in claim 1, wherein said precipitant is foundry iron.

5. The process as claimed in claim 1, wherein said precipitant is perlitic steel.

6. The process as claimed in claim 1, wherein said precipitant is cast iron.

7. The process as claimed in claim 1, wherein said head solution is a copper salt solution having a pH in the range of 1.5 to 3.

8. The process as claimed in claim 1, wherein said additional precipitant is charged substantially continuously with said head solution.

9. The process as claimed in claim 1, wherein said reactor is a substantially horizontal cylindrical vessel, and said agitation is provided by rotating said vessel around its axis whereby said precipitant particles are abraded by tumbling on themselves.

10. A continuous process for the production of copper from acidic salt solutions by cementation on a metallic iron precipitant comprising:
    charging a rotatable reactor vessel with granulated pig iron particles including at least 50% plus 10 mesh particles;
    continuously feeding said salt solution to said reactor and withdrawing spent solution and precipitated copper therefrom while continuously rotating same to tumble said iron on itself;
    continuously maintaining the ratio of iron precipitant to copper in solution within said reactor at a level sufficient to provide a reaction index of at least 1.

11. The process as claimed in claim 10, wherein said index is maintained by substantially continuously adding fresh precipitant to said reactor with said solution.

12. The process as claimed in claim 10, wherein said solution is a copper salt solution having a pH of about 1.5 to 3.

* * * * *

UNITED STATES PATENT OFFICE
CERTIFICATE OF CORRECTION

Patent No. 3,874,940                    Dated April 1, 1975

Inventor(s) LUIS SOTO-KREBS et al

It is certified that error appears in the above-identified patent and that said Letters Patent are hereby corrected as shown below:

On the cover page, item 73, Assignee, should read

Compania de Acero del
      Pacifico S.A. (Chile), Santiago
      Chile

Signed and sealed this 1st day of July 1975.

(SEAL)
Attest:

RUTH C. MASON
Attesting Officer

C. MARSHALL DANN
Commissioner of Patents
and Trademarks